United States Patent
Bellon (10) Patent No.: US 10,718,697 B2
(45) Date of Patent: Jul. 21, 2020

(54) METHOD FOR ESTIMATING A STIFFNESS OF A DEFORMABLE PART

(71) Applicants: CENTRE NATIONAL DE LA RECHERCHE SCIENTIFIQUE, Paris (FR); ECOLE NORMALE SUPERIEURE DE LYON, Lyons (FR); UNIVERSITE CLAUDE BERNARD LYON 1, Villeurbanne (FR)

(72) Inventor: Ludovic Bellon, Le Bois D'Oingt (FR)

(73) Assignees: CENTRE NATIONAL DE LA RECHERCHE SCIENTIFIQUE, Paris (FR); ECOLE NORMALE SUPERIEURE DE LYON, Lyons (FR); UNIVERSITE CLAUDE BERNARD LYON 1, Villeurbanne (FR)

( * ) Notice: Subject to any disclaimer, the term of this patent is extended or adjusted under 35 U.S.C. 154(b) by 193 days.

(21) Appl. No.: 16/067,578

(22) PCT Filed: Dec. 29, 2016

(86) PCT No.: PCT/EP2016/082812
§ 371 (c)(1),
(2) Date: Jun. 29, 2018

(87) PCT Pub. No.: WO2017/114885
PCT Pub. Date: Jul. 6, 2017

(65) Prior Publication Data
US 2019/0011343 A1    Jan. 10, 2019

(30) Foreign Application Priority Data

Dec. 31, 2015 (FR) ..................... 15 63492

(51) Int. Cl.
*G01N 3/20* (2006.01)
*G01Q 20/02* (2010.01)
*G01Q 40/00* (2010.01)

(52) U.S. Cl.
CPC ............... *G01N 3/20* (2013.01); *G01Q 20/02* (2013.01); *G01Q 40/00* (2013.01)

(58) Field of Classification Search
CPC .......... G01N 3/20; G01Q 40/00; G01Q 20/02
See application file for complete search history.

(56) References Cited

U.S. PATENT DOCUMENTS

2018/0164342 A1* 6/2018 Humphris .............. G01Q 20/02

OTHER PUBLICATIONS

Sader, John E., "Spring constant calibration of atomic force microscope cantilevers of arbitrary shape", Review of Scientific Instruments, American Institute of Physics, vol. 83, 2012, pp. 103705-1-103705-16.

(Continued)

*Primary Examiner* — David E Smith
*Assistant Examiner* — Hsien C Tsai
(74) *Attorney, Agent, or Firm* — Womble Bond Dickinson (US) LLP (57) ABSTRACT

A method for estimating a stiffness of a deformable part of a system including a four-photodiode detector for analyzing at least one characteristic of a sample. The method includes receiving the signals recorded by the four photodiodes, calculating the resultant signals from the recorded signals, calculating a cross-correlation of the resultant signals calculated for obtaining an intercorrelated signal, estimating the stiffness of the deformable part depending on the intercorrelated signal.

21 Claims, 3 Drawing Sheets

(56) References Cited

OTHER PUBLICATIONS

Sader, John E., "Effect of cantilever geometry on the optical lever sensitivities and thermal noise method of the atomic force microscope", Review of Scientific Instruments, vol. 85, 2014, pp. 113702-1-113702-6.

Sader, John E., "Calibration of rectangular atomic force microscope cantilevers", Review of Scientific Instruments, American Institute of Physics, vol. 70, No. 10, Oct. 1999, pp. 3967-3969.

Pottier et al., "High bandwidth linear viscoelastic properties of complex fluids from the measurement of their free surface fluctuations", Soft Matter, The Royal Society of Chemistry, vol. 7, 2011, pp. 7843-7850.

Liu et al., "Easy and direct method for calibrating atomic force microscopy lateral force measurements", Review of Scientific Instruments, American Institute of Physics, vol. 78, No. 6, Jun. 15, 2007, pp. 63707-1-63707-7.

International Search Report and Written Opinion received for PCT Patent Application No. PCT/EP2016/082812, dated Mar. 8, 2017, 18 pages (8 pages of English Translation and 10 pages of Original Document).

International Preliminary Report on Patentability received for PCT Patent Application No. PCT/EP2016/082812, dated Jul. 12, 2018, 16 pages (8 pages of English Translation and 8 pages of Original Document).

Hutter et al., Calibration of Atomic-Force Microscope Tips, Review of Scientific Instruments, American Institute of Physics, NY, US, vol. 64, No. 7, Jul. 1993, pp. 1868-1873.

Anonymous, "Cross-correlation—Wikipedia, the free encyclopedia", Aug. 11, 2016, Retrieved from the Internet: https://en.wikipedia.org/wiki/Cross-correlation, Retrieved on Aug. 16, 2016, 5 pages.

\* cited by examiner

METHOD FOR ESTIMATING A STIFFNESS OF A DEFORMABLE PART

FIELD OF THE INVENTION

The present invention relates to a method for processing signals from a set of photodetectors, e.g. as part of an analysis of stationary random fluctuations of a deformation of a mechanical system.

More precisely, the present invention relates to a signal processing method for measuring the deformation of an atomic force microscope microcantilever or of a surface of a solid or liquid material.

BACKGROUND OF THE INVENTION

Near-field microscopy is a known technique for displaying the surface topography of a sample, such as a semiconductor material.

Near-field microscopy is based on the interactions between the sample and a probe-forming tip which scans the surface of a sample line by line.

There are various techniques of near-field microscopy based on different types of physical interactions between the tip and the sample on the one hand, and on different modes of scanning on the other.

Atomic force microscopy (or "AFM") is an example of near-field microscopy.

In an atomic force microscope, the probe-forming tip is arranged at the free end of an elastic microcantilever. This microcantilever is capable of moving in all directions of space thanks to a piezoelectric tube with which it is associated.

The deformations (flexure/torsion) of the microcantilever due to the interaction (attraction or repulsion) between the probe-forming tip and the sample are measured by optical means.

These measurements make it possible both to reconstruct the whole course of the probe-forming tip and to measure the interaction forces between said probe-forming tip and the sample. In order to have a calibrated measurement of these forces, it is necessary to estimate the stiffness of the microcantilever.

The interaction forces are representative of characteristics of the sample such as its hardness, or its electrical conductivity or its topography or its elasticity.

When measuring deformations, the optical means also record a parasitic signal non-specific to the interactions between the probe-forming tip and the outside environment. This parasitic signal called "measurement noise" may disrupt the analysis.

In order to increase the ability of a probe-forming tip to detect low intensity interactions, it is necessary to reduce this measurement noise.

One object of the present invention is to provide a method and a system for processing signals recorded by the optical means of a near-field microscope for improving the sensitivity of the microscope by reducing the effects of measurement noise. More precisely, one object of the present invention is to provide a method and a system for estimating a stiffness of a deformable part of a system for analyzing at least one characteristic of a sample.

BRIEF DESCRIPTION OF THE INVENTION

1. Method According to the Invention

For this purpose, the invention provides a method for estimating a stiffness of a deformable part of a system for analyzing at least one characteristic of a sample, the system including:
- the deformable part capable of interacting with the sample to be analyzed,
- a source, upstream from the deformable part, for emitting a light beam toward the deformable part,
- a sensor, downstream from the source for detecting the beam reflected on the deformable part, said beam being capable of moving in a direction of interest depending on the deformation of the deformable part, the sensor including:
  - at least one first photodetector for recording a first signal representative of a first portion of the beam reflected by the deformable part, and
  - at least one second photodetector arranged in line with the first photodetector in the direction of interest (or successively along the direction of interest) for recording a second signal representative of a second portion of the beam reflected by the deformable part and distinct from the first portion, the first and second signals depending on the deformation;

characterized in that the method comprises the steps consisting in:
- receiving a first signal recorded by the first photodetector, and a second signal recorded by the second photodetector,
- calculating a cross-correlation of the first and second signals for obtaining an intercorrelated signal representative of a power spectral density or a root-mean-square deformation,
- estimating the stiffness of the deformable part depending on the intercorrelated signal.

Calibrating the stiffness of the deformable part by cross-correlation between the signals from the first and second photodetectors makes it possible "to cancel" the contribution of the background noise. This allows the sensitivity of the analysis system to be increased.

Preferred, but non-restrictive aspects of the processing method according to the invention are as follows.

1.1. 1st Embodiment

In one embodiment, the first photodetector may comprise at least one first photodiode and one second photodiode for recording first and second elementary signals, the sum of the first and second elementary signals being representative of the first portion of the reflected beam recorded by the first photodetector. Similarly, the second photodetector may comprise at least one third photodiode and one fourth photodiode for recording third and fourth elementary signals, the sum of the third and fourth elementary signals being representative of the second portion of the reflected beam recorded by the second photodetector. In this case, the method may comprise a step of calculating a first resultant signal from the first and third elementary signals, and a second resultant signal from the second and fourth elementary signals, the step of cross-correlation consisting in intercorrelating the first and second resultant signals for obtaining the intercorrelated signal.

Advantageously, the step consisting in calculating the first and second resultant signals may comprise the following substeps:
  calculating the difference between the first and third elementary signals for obtaining the first resultant signal, and
  calculating the difference between the second and fourth elementary signals for obtaining the second resultant signal.

This makes it possible to increase the sensitivity of the analysis system by enhancing its dynamics.

Preferably, the step consisting in calculating the first and second resultant signals may comprise the following substeps:
  calculating a ratio of the difference between the first and third elementary signals to the sum of the first and third elementary signals, and
  calculating a ratio of the difference between the second and fourth elementary signals to the sum of the second and fourth elementary signals.

This makes it possible to take into account the fluctuations of the source adapted for emitting the light beam.

1.2. 2nd Embodiment

In another embodiment, the first photodetector may comprise at least one first photodiode and one second photodiode for recording first and second elementary signals, the sum of the first and second elementary signals being representative of the first portion of the reflected beam recorded by the first photodetector. Similarly, the second photodetector may comprise at least one third photodiode and one fourth photodiode for recording third and fourth elementary signals, the sum of the third and fourth elementary signals being representative of the second portion of the reflected beam recorded by the second photodetector. In this case, the method may comprise a step of calculating a first resultant signal from the first and second elementary signals, and a second resultant signal from the third and fourth elementary signals, the step of cross-correlation consisting in intercorrelating the first and second resultant signals for obtaining the intercorrelated signal.

Advantageously, the step consisting in calculating the first and second resultant signals may comprise the following substeps:
  calculating the difference between the first and second elementary signals for obtaining the first resultant signal, and
  calculating the difference between the third and fourth elementary signals for obtaining the second resultant signal.

This makes it possible to increase the sensitivity of the analysis system by enhancing its dynamics.

Preferably, the step consisting in calculating the first and second resultant signals comprises the following substeps:
  calculating a ratio of the difference between the first and second elementary signals to the sum of the first and second elementary signals, and
  calculating a ratio of the difference between the third and fourth elementary signals to the sum of the third and fourth elementary signals.

This makes it possible to take into account the fluctuations of the source adapted for emitting the light beam.

2. Device According to the Invention

The invention also relates to a device for estimating a stiffness of a deformable part of a system for analyzing at least one characteristic of a sample, the system including:
  the deformable part capable of interacting with the sample to be analyzed,
  a source, upstream from the deformable part, for emitting a light beam toward the deformable part,
  a sensor downstream from the source for detecting the beam reflected on the deformable part, said beam being capable of moving in a direction of interest depending on the deformation of the deformable part, the sensor including at least one first photodetector for recording a first signal representative of a first portion of the beam reflected by the deformable part, and at least one second photodetector arranged in line with the first photodetector in the direction of interest for recording a second signal representative of a second portion of the beam reflected by the deformable part and distinct from the first portion, the first and second signals depending on the deformation;
characterized in that the device comprises:
  a receiver for receiving a first signal recorded by the first photodetector, and a second signal recorded by the second photodetector,
  a processor programmed for:
    calculating a cross-correlation of the first and second signals for obtaining an intercorrelated signal representative of a power spectral density or a root-mean-square deformation,
    estimating the stiffness of the deformable part depending on the intercorrelated signal.

In a variant embodiment, the processor of the device may be programmed for implementing the steps of the method described above.

3. Computer Program Product According to the Invention

The invention also relates to a computer program product including program code instructions recorded on a computer-readable medium, for implementing the steps of the method described above when said program is run on a computer.

BRIEF DESCRIPTION OF THE DRAWINGS

Other advantages and features of the method according to the invention and the associated system will better emerge from the following description of several variant implementations, given by way of non-restrictive examples, from the appended drawings in which.

DETAILED DESCRIPTION OF THE INVENTION

A description will now be given of various examples of processing methods according to the invention with reference to the calibration of an atomic force microscopy probe or to thermal rheology by surface fluctuation analysis, it being understood that the invention may be applied to the processing of signals from other types of mechanical deformation. In these various figures, the equivalent elements are designated by the same numerical reference.

1. General Points on the Atomic Force Microscope

Figure 1:
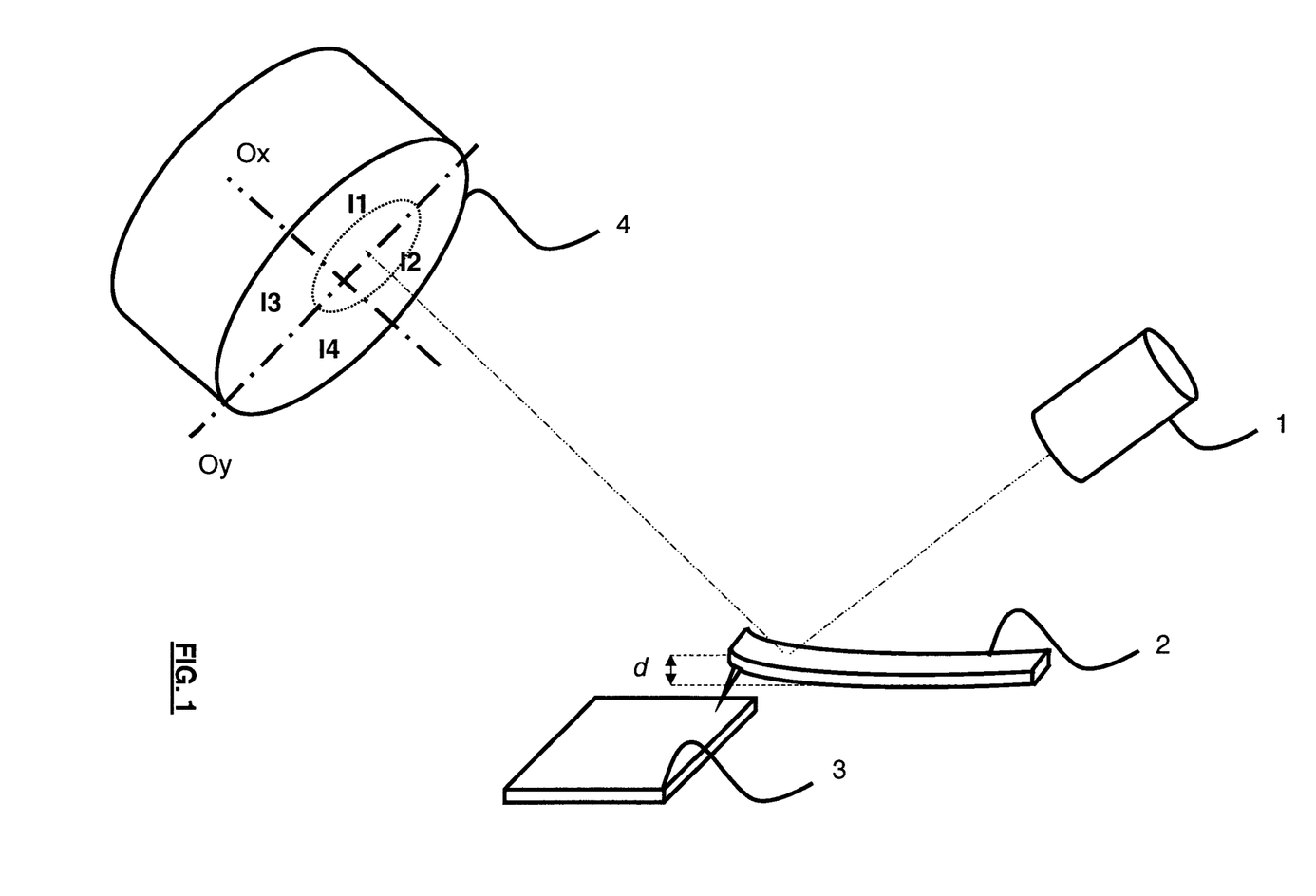
FIG. 1 is a schematic representation of an atomic force microscope and its optical detection.

FIG. 1 schematically illustrates the main components of an atomic force microscope.

The microscope comprises a deformable part 2 forming an analysis probe of the surface of a sample. This deformable part is held in the microscope by a holder. The deformable part 2 comprises an elastically deformable blade. The blade (also referred to as a lever or microcantilever) is essentially flat and reflects (at least partially) the light on its upper face. The blade is only rigidly connected to the microscope at one end. It thus extends in cantilevered fashion. The blade bears a tip suitable for coming into contact with the sample to be analyzed. The tip extends perpendicularly to the plane of the blade.

The microscope further comprises a movable sample holder table 3. This table is movable, along three orthogonal directions, with respect to the analysis probe under the action of displacement means of any suitable type. These means ensure the relative displacement of the probe with respect to the sample substantially along a plane parallel to the surface of the sample for scanning the whole surface of the sample with the probe.

Finally, the atomic force microscope comprises means of optical measurement of the deflection of the probe. The means of optical measurement comprise a light source 1, and a light beam sensor 4. The positionings of the source 1 and the sensor 4 are of types known per se by the person skilled in the art. Notably, the source 1 is oriented so as to generate a light beam illuminating the blade, and more precisely a light beam focused on the end of the microcantilever bearing the tip. The sensor 4 is positioned in a plane perpendicular to the optical axis of the light beam reflected by the microcantilever.

The source 1 and the sensor 4 make it possible to determine the evolution of the deflection and torsion of the elastic blade during the displacement of the probe at the surface of the sample.

The source 1 is, for example, a laser (acronym for "Light Amplification by Stimulated Emission of Radiation"), or any other type of device known to the person skilled in the art and capable of producing focused light radiation.

The sensor 4 is advantageously a multi-photodiode detector such as a four-quadrant detector comprising four photodiodes I1-I4 arranged symmetrically with respect to two perpendicular axes Ox and Oy: first and third photodiodes I1 and I3 (second and fourth photodiodes I2 and I4 respectively) are arranged symmetrically with respect to a first axis Ox. On the other hand, the first and second photodiodes I1 and I2 (the third and fourth photodiodes I3 and I4 respectively) are arranged symmetrically with respect to a second axis Oy perpendicular to the axis Ox, so that the axes Ox and Oy are axes of symmetry of the sensor 4. The first, second, third and fourth photodiodes I1-I4 are thus distributed into four measurement quadrants. The four photodiodes I1-I4 may have a square, rectangular or other shape, e.g. corresponding to four right-angled sectors of a circle. The sensor may be integrally formed in semiconductor material, or be composed of a grouping of distinct photosensitive elements selected so as to exhibit the same sensitivity characteristics.

The atomic force microscope operates in the following way.

The movable table 3 holding the sample is set in motion so that the probe-forming tip scans the surface of the sample line by line.

The light beam generated by the source 1 is reflected on the blade. The position of the reflected light beam is recorded by the sensor 4. More precisely, the beam illuminates the four photodiodes I1 to I4 simultaneously, according to a distribution of intensity specific to its position.

When the light beam is not deflected, it strikes at the center of the four quadrants of the sensor, and therefore equally illuminates the four photodiodes I1 to I4. If the light beam is deflected, it is the blade that is bent (in one direction or the other), which is indicative of the interaction forces between the tip and the surface of the sample, or an intrinsic deformation of the microcantilever.

If the light beam is deflected upward, the two upper photodiodes (that is, the first and second photodiodes I1 and I2) receive more light than the lower photodiodes (that is, the third and fourth photodiodes I3 and I4), and therefore a difference in photocurrent appears between the upper and lower photodiodes. The same phenomenon occurs in the case of a lateral deviation, the first and third photodiodes I1 and I3 then receive a different intensity from the second and fourth photodiodes I2 and I4.

The measurement of the deflection and the torsion of the tip therefore passes through that of the vertical and lateral position of the reflected light beam. With respect to its position of rest (i.e. beam not deflected), the displacement of the beam along a direction of interest on the sensor 4 is representative of a deformation of the probe:

the vertical displacement of the beam along the axis Oy is representative of a flexure of the probe, the lateral displacement of the beam along the axis Oy is representative of a torsion of the probe.

2. General Points on Thermal Rheology by Surface Fluctuation Analysis

Figure 2:
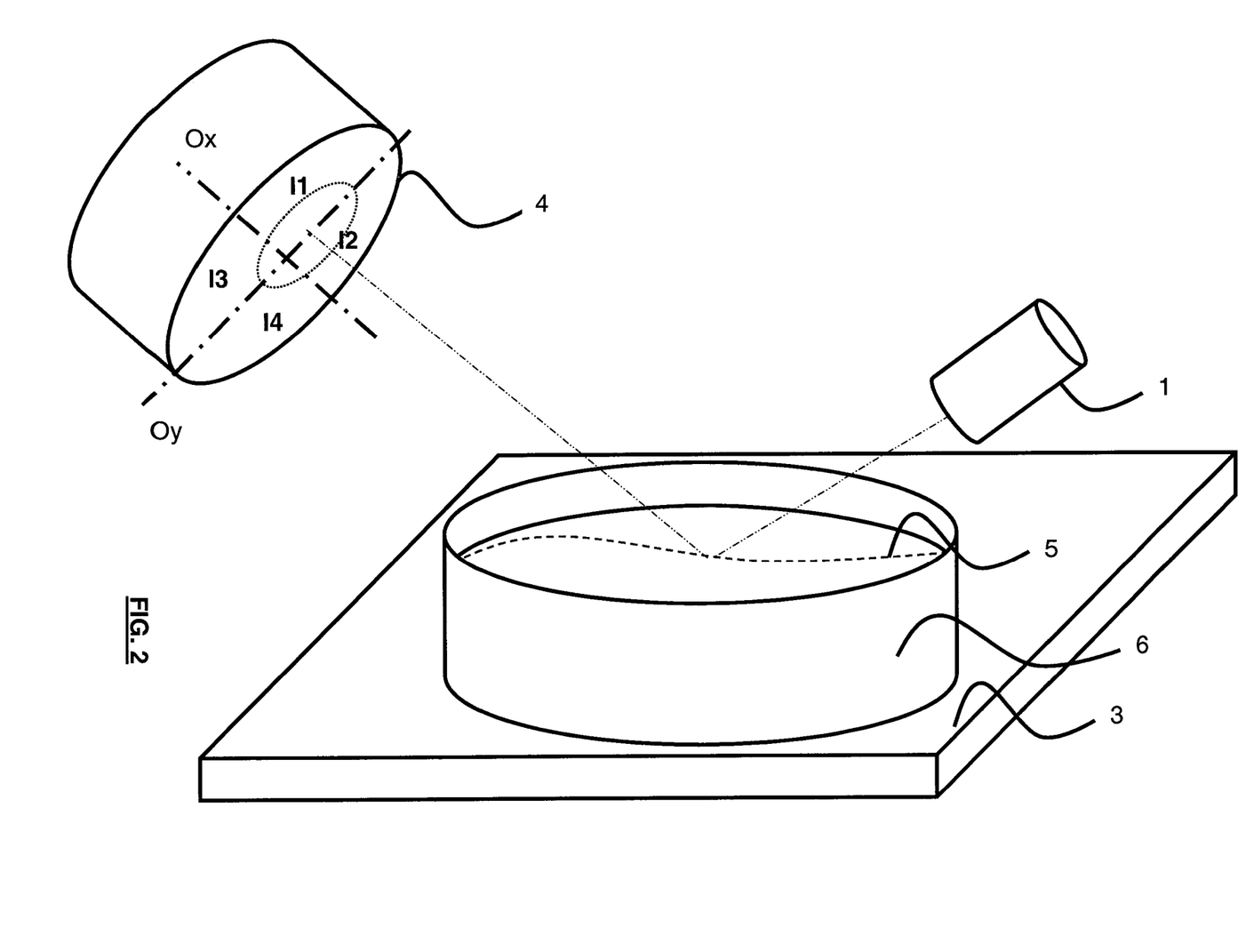
FIG. 2 is a schematic representation of a deformation measurement of a surface by optical detection.

With reference to FIG. 2, the main components have been schematically illustrated of a system of analysis of the deformation of the surface of a sample by specular reflection.

The material to be analyzed exhibits a free surface 5, horizontal at rest, but likely to deform under the action of external forces or its own thermal fluctuations. This material may be liquid, and is then contained in a container 6, or solid.

As for the analysis of the deformation of an AFM microcantilever, a light beam is focused on the surface and its (partial) reflection is collected by a sensor 4. The position of the light beam on the sensor 4 provides information on the local slope of the free interface of the material, and therefore makes it possible to follow the deformations of its surface.

Modeling the spontaneous deformation of the surface under the effect of intrinsic thermal fluctuations makes it possible to link the frequency spectrum of the deformation to the rheological properties of the material: viscosity and surface tension of a fluid, elastic modulus and mechanical loss angle of a solid, etc. [B. Pottier, G. Ducouret, C. Frétigny, F. Lequeux and L. Talini, Soft Matter, 2011, 7, 7843].

Measuring the vertical and lateral position of the reflected light beam ultimately makes it possible to measure the mechanical properties of the material, without mechanical contact or external stress.

It will be noted that measuring the reflection of the beam is not the only possibility for measuring the deformation of the surface, the refraction of the beam in a transparent medium makes it possible to achieve the same objective.

Unlike conventional rheometric measurements, this technique has the advantage of probing the sample without imposing any flow, it provides access to the properties in a wide range of frequencies and requires only a small amount of matter. Unlike micro-rheology, it is a noninvasive technique, which may be applied to both low viscosity fluids and viscoelastic solids, whether or not they are transparent.

3. Processing Method

In both previous applications, the sensor records signals representative of the position of the beam reflected by the microcantilever or the surface of the material.

More precisely, at each instant, each photodiode I1 to I4 picks up a signal S1-S4, which is amplified in an amplifying device and stored in a memory for its subsequent processing by a processing system.

The processing system may comprise a computer (e.g. a processor), input means (e.g. a keyboard, a touch screen, etc.), display means (e.g. a screen), and transmitting/receiving means (including, for example, an antenna) for exchanging data with remote devices. The processing system is, for example, composed of one (or more) workstation(s), and/or one (or more) computer(s) and/or a mobile phone, and/or a tablet (such as an iPad®), a personal assistant (or PDA, abbreviation of "Personal Digital Assistant"), and/or any other type of terminal known to the person skilled in the art.

Figure 3:
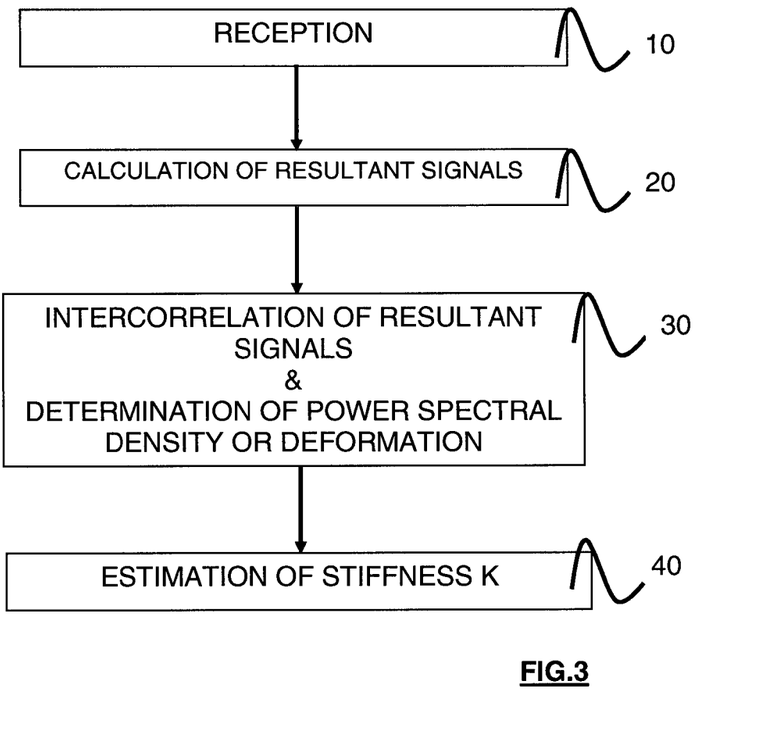
FIG. 3 is a schematic representation of steps of a signal processing method.

Advantageously, the processing system is programmed for implementing the steps of the method illustrated in FIG. 3 and which will be described in more detail hereafter.

In one step of the method, the signals recorded by the photodiodes are received by the processing system (step 10).

In another step (step 20), the individual signals from the photodiodes are used for calculating the resultant signals.

More precisely, when measuring the deflection of the blade 2, the individual signals are combined to form by difference two groups of vertical signals according to the following formulas:

$$VERT1 = S1-S3$$

$$VERT2 = S2-S4,$$

Where:
S1 to S4 are the individual signals from the four photodiodes I1 to I4 recorded at a given time,
VERT 1 and VERT 2 correspond respectively to a difference between the signals picked up by the first and third photodiodes I1 and I3 and a difference between the signals picked up by the second and fourth photodiodes I2 and I4.

When measuring the torsion of the blade 2, the individual signals are combined to form by difference two groups of lateral signals according to the following formulas:

$$LAT1 = S1-S2$$

$$LAT2 = S3-S4,$$

Where:
S1 to S4 are the individual signals from the four photodiodes I1 to I4 recorded at a given time,
LAT 1 and LAT 2 correspond respectively to a difference between the signals picked up by the first and second photodiodes I1 and I2 and a difference between the signals picked up by the third and fourth photodiodes I3 and I4.

In other words, during the measurements of deflection and torsion of the deformable part 2, the photodiodes are considered per pair, and a difference between the signals recorded by the photodiodes of the pair is calculated for each pair:
for calculating a lateral displacement of the light beam reflected by the probe, the pairs are defined with respect to the first axis Ox (the photodiodes I1 and I2 form a first pair while the photodiodes I3 and I4 form a second pair),
for calculating a vertical displacement of the light beam reflected by the probe, the pairs are defined with respect to the second axis Oy (the photodiodes I1 and I3 form a first pair while the photodiodes I2 and I4 form a second pair).

The combined signals are then normalized by dividing each of the combined signals by the sum of the signals recorded by the photodiodes of each pair.

Hence, in the case of a deflection measurement:

$$NORM1 = \frac{VERT1}{S1+S3} = \frac{S1-S3}{S1+S3}$$

$$NORM2 = \frac{VERT2}{S2+S4} = \frac{S2-S4}{S2+S4}$$

In the case of a torsion measurement:

$$NORM1 = \frac{LAT1}{S1+S2} = \frac{S1-S2}{S1+S2}$$

$$NORM2 = \frac{LAT2}{S3+S4} = \frac{S3-S4}{S3+S4}$$

In other words for each pair of photodiodes, the difference in the signals VERT 1, VERT 2, LAT1, LAT2 is divided by the sum of the signals recorded by the photodiodes of the pair considered. Normalizing the differences makes them comparable. Indeed, the signals recorded by the photodiodes of the first and second pairs do not have a comparable intensity if a lateral displacement is combined with a vertical displacement. It is therefore necessary to normalize the differences VERT 1 and VERT 2, LAT1, LAT2 by dividing each of them by the sum of the signals recorded by the upper and lower photodiodes of each respective pair.

The normalized differences NORM 1 and NORM 2 are then about equal to the noise. Hence:

$$NORM1 = NORM2 + \Delta B,$$

Where:
$\Delta B$ represents the difference between the noise measured by the photodiodes of the first pair and the noise measured by the photodiodes of the second pair.

In another step, the normalized differences NORM 1 and NORM 2 are correlated (step 30) between them ("cross-correlation" or "intercorrelation") for overcoming the measurement noise $\Delta B$. Indeed, the measurement noise between the signals recorded by the first pair of photodiodes and the signals recorded by the second pair of photodiodes is separate and does not therefore have any physical link.

Thus the cross-correlation of the normalized differences NORM and NORM 2 makes it possible to cancel the measurement noise.

The result of the intercorrelation between the normalized differences NORM 1 and NORM 2 is used to determine the root-mean-square value of the deformation, or its power spectral density.

In another step, the stiffness of the probe is estimated (step 40) using the equipartition of energy formula. Of course, the person skilled in the art will appreciate that the stiffness of the probe may be estimated using techniques other than the equipartition of energy formula.

By way of illustration, three methods for estimating the stiffness of the probe are described below.

A first method for determining the stiffness K is to consider the root-mean-square value of the deflection $<d^2>$, for which the following formula may be applied:

The temperature T and the Boltzmann constant $k_B$ are known. Measuring $<d^2>$ makes it possible to determine the stiffness K of the probe.

A second method for determining the stiffness K consists in an adjustment of the power spectral density of the deflection $S_d(f)$ by a thermal noise model of an oscillator: for a harmonic oscillator, for example, a spectrum is expected of the form:

Where $f_0$ and Q are the resonance frequency and the quality factor of the harmonic oscillator respectively. The stiffness may be estimated by making an adjustment of $S_d(f)$ through this formula where the parameters $f_0$, Q and K are adjustable.

Other oscillator models may be considered. A viscoelastic damping, for example, predicts a Lorentzian form for the spectrum close to the resonance:

The same adjustment procedure makes it possible to estimate the value of the parameters K, $f_0$ and Q, and therefore the stiffness of the lever.

A third method also uses an adjustment of the power spectral density by a harmonic oscillator model, but deduces the stiffness from Sader's model [J. E. Sader et al., Rev. Sci. Instrum., 70, 3967 (1999), Rev. Sci. Instrum., 83, 103705 (2012), Rev. Sci. Instrum., 85, 113702 (2014)]: the knowledge of the dimensions of a lever (length, width), its resonance frequency $f_0$, the quality factor Q of the resonance in a fluid of known density and viscosity makes it possible to calculate its stiffness. In this method, measuring the deflection "d" does not need to be calibrated in order to obtain the value of K.

The interest of the step of estimating the stiffness of the probe will be described in more detail in the following theoretical part.

4. Theory Relating to the Invention

Measuring deformation d of an object is conventionally performed with an optical sensor. Two examples are described here where this deformation is measured using an angular deflection measurement technique: a laser is focused on a surface, and the position of its reflection on an optical sensor provides a signal proportional to the variation in slope of the surface.

The first example relates to atomic force microscopy (AFM). The measurement technique by angular deflection is overwhelmingly for commercial AFMs: the laser is focused on the free end of the lever, and the position of its reflection on the optical sensor provides a signal proportional to the deflection d. Measuring d then provides information on the interaction between the tip and the sample, and allows many studies such as measuring the topography of a surface, its mechanical, electrical, and magnetic properties, etc.

The second example relates to measuring the rheological properties of a soft material (viscosity of a fluid, viscoelastic modulus of a gel, etc.) using its thermal fluctuations at the surface. Indeed, the mechanical properties of such a material are reflected in the amplitude and frequency distribution of the spontaneous deformation of its free surface under the effect of the thermal fluctuations. The analysis of a focused beam reflected or refracted by the surface then allows tracing the rheological properties of the material. Again, it is the position of the laser beam on the optical sensor that provides information on the deformation of the surface.

Conventionally, the position of the laser beam is analyzed using an optical sensor in the form of a segmented photodiode (four quadrants).

The difference in the intensities between the two upper quadrants and that of the two lower quadrants, normalized to the total intensity, gives the position of the beam (normalized to its diameter) and is insensitive to the fluctuations in light intensity:

$C=[(S_1+S_2)-(S_3+S_4)]/[(S_1+S_2)+(S_3+S_4)]\sim d.$

Even if the packaging electronics of the photodiodes is carefully produced to minimize the detection noise, the photodiodes have an intrinsic noise due to the corpuscular nature of photons: "shot noise".

Hence typically:

$C\sim d+b,$

Where:

b is the intrinsic background noise of the sensor.

The measurement noise is typically random and zero mean: $<b>=0$.

If the quantity of interest is the average value of the deformation $<d>$, then the simple operation of averaging the measurement converges toward the quantity sought:

$<d>=<C>,$

If the quantity of interest is the root-mean-square of the deformation, $<d^2>$, then the operation of averaging is no longer sufficient to make the measurement noise disappear. Indeed, in the typical case of a decorrelated noise of the deformation, then $<d^2>=<C^2>-<b^2>,$ Estimating $<d^2>$ then calls for the separate determination of $<b^2>$, at best an undesirable operation since it may demand manipulation and an additional acquisition time, at worst impossible if the measurement noise is, for example, not stationary.

This scenario notably applies to the measurement of stationary random fluctuations, such as those due to thermal fluctuations. The quantity of interest is then the power spectral density of the deformation, $S_d(f)$, defined as the root-mean-square of the Fourrier transform of the temporal signal. Hence in an equivalent manner:

$S_d(f)=S_c(f)-S_b(f),$

Where the noise spectral density $S_b(f)$ is not known a priori and must be estimated separately.

In the context of the first example, a conventional application of the measurement of $<d^2>$ or $S_d(f)$ is the calibration of the stiffness K of a microcantilever in atomic force microscopy. The thermal fluctuations of its deflection d are theoretically described using a harmonic oscillator model and the fluctuation-dissipation theorem.

For $<d^2>$, for example, the equipartition theorem of energy implies:

$½k<d^2>=½k_BT,$

Where:

"$k_B$" is the Boltzmann constant, and

"T" is the temperature of the lever.

"$k_B$" and "T" being known, the measurement of the root-mean-square deflection $<d^2>$ therefore makes it possible to calibrate the stiffness K. However, the accessible signal is $<C^2>=<d^2>+<b^2>$. If the stiffness of the lever is high, $</d^2>$ becomes small compared to $</b^2>$, and the stiffness is no longer measurable: the thermal fluctuations become very weak and buried in the measurement noise.

In the context of a standard AFM detection, the power spectral density of this noise is typically established around $10^{-12}$-$10^{-13}$ m/√Hz, limiting the measurement accuracy of the stiffnesses beyond 10 N/m: the signal (thermal fluctuation) to noise ("shot noise") ratio is of order 1 for a stiffness of 10 N/m and a bandwidth of a few kHz.

In the context of our second example, an application of the measurement of $S_d(f)$ is the measurement of the rheological properties of a soft material using its thermal fluctuations at the surface. Indeed, the form and amplitude of the spectrum $S_d(f)$ are related to the mechanical properties of such a material. Again, the fluctuation spectrum $S_d(f)$ will be buried in the measurement noise for rigid materials or high-frequency studies.

In the surface fluctuation measurements of a soft material, the noise is typically established around $10^{-6}$-$10^{-7}$ rad/√Hz. It limits the measurement of the mechanical properties of an elastomer, the elastic modulus of which reaches about a hundred kPa at frequencies below 10 kHz.

A first possible method for reducing the background noise may consist in the use of a second sensor to measure the same quantity: if the laser beam is split in two (e.g. using a beam splitter cube) and it is measured with the same technique then two signals are obtained:

$C_1 = d + b_1$, and $C_2 = d + b_2$.

The calculation of the cross-correlation of the signals then makes it possible to cancel on average the contribution of the background noise:

$<C_1 C_2> = <d^2> (b_1, b_2$ and $d$ are decorrelated).

This method, however, is restrictive since it assumes duplicating the measuring device, and it complicates the optical alignment.

A second possible method for reducing the background noise may consist in applying the first method with a single four-quadrant sensor: indeed this has a sufficient number of signals for applying the cross-correlation technique without an additional sensor.

Indeed, $C_1$ and $C_2$ may be defined by:

$C_1 = (S_1 - S_3)/(S_1 + S_3)$, and $C_2 = (S_2 - S_4)/(S_2 + S_4)$.

Then:

$C_1 = d + b_1$, and $C_2 = d + b_2$.

The two signals thus defined are independent of fluctuations in total light intensity or lateral position of the beam (torsion of the lever in the first example, lateral deformation of the surface in the second example), and their shot noises are decorrelated.

The cross-correlation technique may therefore be applied with a single four-quadrant sensor, without any modification to the existing measuring system.

Measuring a thermal noise is then possible with high resolution, but in general this technique may be applied to all stationary or periodic deformation signals: the measurement noise contribution may then be averaged to 0.

In the contexts of the two examples cited, the gain in terms of background noise is thus quickly by a factor of 100. For AFM probe stiffness calibration applications, stiffnesses up to 100 N/m thus become accessible. For measuring the rheological properties of soft materials, the use of cross-correlation makes it possible, for example, to characterize a material, the elastic modulus of which reaches about a hundred kPa up to MHz, or those of materials having an elastic modulus close to MPa up to ten or so kHz.

Beyond a four-quadrant sensor, it applies to all sensors having redundant signals.

The reader will have understood that many modifications may be made to the previously described invention without materially departing from the new teachings and advantages described here.

For example, even if in the preceding description, the method according to the invention was described with reference to estimating a stiffness K of a probe, the person skilled in the art will appreciate that the previously described method may be used for applications other than estimating a stiffness K of a spring.

Notably, the previously described method may be useful for simply bringing out otherwise invisible resonances in a noisy signal. Indeed, it is sometimes useful in atomic force microscopy to identify the resonances of the lever, which are oscillation eigenmodes.

When the lever is vibrated by an external means for identifying these resonances, artifacts appear: the excitation system, the lever holder, or its environment in general may also have resonances that will appear in the estimated frequency response, and it may be difficult to know which resonance peaks are those sought.

Thermal noise is much more robust for this identification, since the amplitude of the peaks due to the environment is generally very low compared to the modes intrinsic to the lever. As previously described, thermal noise is very low and measurement noise may hide the peaks sought in the spectrum. The cross-correlation technique makes it possible to reduce the background noise and thus bring out this information.

The previously described method may therefore be used for determining the resonance frequencies and quality factors of a lever, without, however, estimating its stiffness.

Consequently, all modifications of this type are intended to be incorporated within the scope of the attached claims.

The invention claimed is:

1. A method for estimating a stiffness of a deformable part of a system for analyzing at least one characteristic of a sample, the system including:
   the deformable part capable of interacting with the sample to be analyzed,
   a source, upstream from the deformable part, for emitting a light beam toward the deformable part,
   a sensor downstream from the source for detecting the beam reflected on the deformable part, said beam being capable of moving in a direction of interest depending on the deformation of the deformable part, the sensor including at least one first photodetector for recording a first signal representative of a first portion of the beam reflected by the deformable part, and at least one second photodetector arranged in line with the first photodetector in the direction of interest for recording a second signal representative of a second portion of the beam reflected by the deformable part and distinct from the first portion, the first and second signals depending on the deformation;
wherein the method comprises the steps consisting in:
   receiving a first signal recorded by the first photodetector, and a second signal recorded by the second photodetector, calculating a cross-correlation of the first and second signals for obtaining an intercorrelated signal representative of a power spectral density or a root-mean-square deformation, estimating the stiffness of the deformable part depending on the intercorrelated signal.

2. The estimating method according to claim 1, wherein:

the first photodetector comprises at least one first photodiode and one second photodiode for recording first and second elementary signals, the sum of the first and second elementary signals being representative of the first portion of the reflected beam recorded by the first photodetector, the second photodetector comprises at least one third photodiode and one fourth photodiode for recording third and fourth elementary signals, the sum of the third and fourth elementary signals being representative of the second portion of the reflected beam recorded by the second photodetector, the method comprising a step of calculating a first resultant signal from the first and third elementary signals, and a second resultant signal from the second and fourth elementary signals, the step of calculating a cross-correlation consisting in intercorrelating the first and second resultant signals for obtaining the intercorrelated signal.

3. The estimating method according to claim 2, wherein the step consisting in calculating the first and second resultant signals comprises the following substeps:

calculating the difference between the first and third elementary signals for obtaining the first resultant signal, and calculating the difference between the second and fourth elementary signals for obtaining the second resultant signal.

4. The estimating method according to claim 2, wherein:

the step consisting in calculating the first and second resultant signals comprises the following substeps:

calculating a ratio of the difference between the first and third elementary signals to the sum of the first and third elementary signals, and calculating a ratio of the difference between the second and fourth elementary signals to the sum of the second and fourth elementary signals.

5. The estimating method according to claim 1, wherein:

the first photodetector comprises at least one first photodiode and one second photodiode for recording first and second elementary signals, the sum of the first and second elementary signals being representative of the first portion of the reflected beam recorded by the first photodetector, the second photodetector comprises at least one third photodiode and one fourth photodiode for recording third and fourth elementary signals, the sum of the third and fourth elementary signals being representative of the second portion of the reflected beam recorded by the second photodetector, the method comprising a step of calculating a first resultant signal from the first and second elementary signals, and a second resultant signal from the third and fourth elementary signals, the step of calculating a cross-correlation consisting in intercorrelating the first and second resultant signals for obtaining the intercorrelated signal.

6. The estimating method according to claim 5, wherein the step consisting in calculating the first and second resultant signals comprises the following substeps:

calculating the difference between the first and second elementary signals for obtaining the first resultant signal, and calculating the difference between the third and fourth elementary signals for obtaining the second resultant signal.

7. The estimating method according to claim 5, wherein:

the step consisting in calculating the first and second resultant signals comprises:

calculating a ratio of the difference between the first and second elementary signals to the sum of the first and second elementary signals, and calculating a ratio of the difference between the third and fourth elementary signals to the sum of the third and fourth elementary signals.

8. A device for estimating a stiffness of a deformable part of a system for analyzing at least one characteristic of a sample, the system including:

the deformable part capable of interacting with the sample to be analyzed, a source, upstream from the deformable part, for emitting a light beam toward the deformable part, a sensor downstream from the source for detecting the beam reflected on the deformable part, said beam being capable of moving in a direction of interest depending on the deformation of the deformable part, the sensor including at least one first photodetector for recording a first signal representative of a first portion of the beam reflected by the deformable part, and at least one second photodetector arranged in line with the first photodetector in the direction of interest for recording a second signal representative of a second portion of the beam reflected by the deformable part and distinct from the first portion, the first and second signals depending on the deformation;

wherein the device comprises:

a receiver for receiving a first signal recorded by the first photodetector, and a second signal recorded by the second photodetector, a processor programmed for:

calculating a cross-correlation of the first and second signals for obtaining an intercorrelated signal representative of a power spectral density or a root-mean-square deformation, estimating the stiffness of the deformable part depending on the intercorrelated signal.

9. The estimating device according to claim 8, wherein:

the first photodetector comprises at least one first photodiode and one second photodiode for recording first and second elementary signals, the sum of the first and second elementary signals being representative of the first portion of the reflected beam recorded by the first photodetector, the second photodetector comprises at least one third photodiode and one fourth photodiode for recording third and fourth elementary signals, the sum of the third and fourth elementary signals being representative of the second portion of the reflected beam recorded by the second photodetector, the processor being programmed for calculating a first resultant signal from the first and third elementary signals, and a second resultant signal from the second and fourth elementary signals, the step of calculating a cross-correlation consisting in intercorrelating the first and second resultant signals for obtaining the intercorrelated signal.

10. The estimating device according to claim 9, wherein the processor is programmed for:
   calculating the difference between the first and third elementary signals for obtaining the first resultant signal, and
   calculating the difference between the second and fourth elementary signals for obtaining the second resultant signal.

11. The estimating device according to claim 9, wherein the processor is programmed for:
   calculating a ratio of the difference between the first and third elementary signals to the sum of the first and third elementary signals, and
   calculating a ratio of the difference between the second and fourth elementary signals to the sum of the second and fourth elementary signals.

12. The estimating device according to claim 8, wherein:
   the first photodetector comprises at least one first photodiode and one second photodiode for recording first and second elementary signals, the sum of the first and second elementary signals being representative of the first portion of the reflected beam recorded by the first photodetector,
   the second photodetector comprises at least one third photodiode and one fourth photodiode for recording third and fourth elementary signals, the sum of the third and fourth elementary signals being representative of the second portion of the reflected beam recorded by the second photodetector,
the processor being programmed for calculating a first resultant signal from the first and second elementary signals, and a second resultant signal from the third and fourth elementary signals, the step of calculating a cross-correlation consisting in intercorrelating the first and second resultant signals for obtaining the intercorrelated signal.

13. The estimating device according to claim 12, wherein the processor is programmed for:
   calculating the difference between the first and second elementary signals for obtaining the first resultant signal, and
   calculating the difference between the third and fourth elementary signals for obtaining the second resultant signal.

14. The estimating device according to claim 12, wherein the processor is programmed for:
   calculating a ratio of the difference between the first and second elementary signals to the sum of the first and second elementary signals, and
   calculating a ratio of the difference between the third and fourth elementary signals to the sum of the third and fourth elementary signals.

15. A non-transitory computer readable medium storing a program with code instructions for applying a method for estimating a stiffness of a deformable part of a system for analyzing at least one characteristic of a sample, the system including:
   the deformable part capable of interacting with the sample to be analyzed,
   a source, upstream from the deformable part, for emitting a light beam toward the deformable part,
   a sensor downstream from the source for detecting the beam reflected on the deformable part, said beam being capable of moving in a direction of interest depending on the deformation of the deformable part, the sensor including at least one first photodetector for recording a first signal representative of a first portion of the beam reflected by the deformable part, and at least one second photodetector arranged in line with the first photodetector in the direction of interest for recording a second signal representative of a second portion of the beam reflected by the deformable part and distinct from the first portion, the first and second signals depending on the deformation;
wherein the method comprises the steps consisting in:
   receiving a first signal recorded by the first photodetector, and a second signal recorded by the second photodetector,
   calculating a cross-correlation of the first and second signals for obtaining an intercorrelated signal representative of a power spectral density or a root-mean-square deformation,
   estimating the stiffness of the deformable part depending on the intercorrelated signal.

16. The non-transitory computer readable medium according to claim 15, wherein:
   the first photodetector comprises at least one first photodiode and one second photodiode for recording first and second elementary signals, the sum of the first and second elementary signals being representative of the first portion of the reflected beam recorded by the first photodetector,
   the second photodetector comprises at least one third photodiode and one fourth photodiode for recording third and fourth elementary signals, the sum of the third and fourth elementary signals being representative of the second portion of the reflected beam recorded by the second photodetector,
the method comprising a step of calculating a first resultant signal from the first and third elementary signals, and a second resultant signal from the second and fourth elementary signals,
the step of calculating a cross-correlation consisting in intercorrelating the first and second resultant signals for obtaining the intercorrelated signal.

17. The non-transitory computer readable medium according to claim 16, wherein the step consisting in calculating the first and second resultant signals comprises the following substeps:
   calculating the difference between the first and third elementary signals for obtaining the first resultant signal, and
   calculating the difference between the second and fourth elementary signals for obtaining the second resultant signal.

18. The non-transitory computer readable medium according to claim 16, wherein:
   the step consisting in calculating the first and second resultant signals comprises the following substeps:
      calculating a ratio of the difference between the first and third elementary signals to the sum of the first and third elementary signals, and
      calculating a ratio of the difference between the second and fourth elementary signals to the sum of the second and fourth elementary signals.

19. The non-transitory computer readable medium according to claim 15, wherein:
   the first photodetector comprises at least one first photodiode and one second photodiode for recording first and second elementary signals, the sum of the first and second elementary signals being representative of the first portion of the reflected beam recorded by the first photodetector,
   the second photodetector comprises at least one third photodiode and one fourth photodiode for recording third and fourth elementary signals, the sum of the third and fourth elementary signals being representative of the second portion of the reflected beam recorded by the second photodetector, the method comprising a step of calculating a first resultant signal from the first and second elementary signals, and a second resultant signal from the third and fourth elementary signals, the step of calculating a cross-correlation consisting in intercorrelating the first and second resultant signals for obtaining the intercorrelated signal.

20. The non-transitory computer readable medium according to claim 19, wherein the step consisting in calculating the first and second resultant signals comprises the following substeps:

- calculating the difference between the first and second elementary signals for obtaining the first resultant signal, and
- calculating the difference between the third and fourth elementary signals for obtaining the second resultant signal.

21. The non-transitory computer readable medium according to claim 19, wherein:

- the step consisting in calculating the first and second resultant signals comprises:
  - calculating a ratio of the difference between the first and second elementary signals to the sum of the first and second elementary signals, and
  - calculating a ratio of the difference between the third and fourth elementary signals to the sum of the third and fourth elementary signals.

\* \* \* \* \*